United States Patent

[11] 3,619,045

| [72] | Inventor | Otto R. Nemeth<br>Santa Monica, Calif. |
|---|---|---|
| [21] | Appl. No. | 743,203 |
| [22] | Filed | July 8, 1968 |
| [45] | Patented | Nov. 9, 1971 |
| [73] | Assignees | Anthony M. Frank;<br>Charles A. Palmer<br>Calif., part interest to each |

[54] MOVIE FILM SOUND VIEWER
16 Claims, 13 Drawing Figs.

[52] U.S. Cl. .................................................. 352/27,
352/72, 352/78, 352/129, 352/159
[51] Int. Cl. ......................................................... G03b31/02,
G03b 23/02
[50] Field of Search .......................................... 352/14, 27,
243, 180, 196, 72, 78, 129, 159; 74/230.17

[56] References Cited
UNITED STATES PATENTS

| 1,831,346 | 11/1931 | Dina ........................ | 352/243 |
| 2,064,275 | 12/1936 | Sontagh et al. .......... | 352/196 |
| 2,157,757 | 5/1939 | Jacobsen .................. | 74/230.17 |
| 2,893,287 | 7/1959 | Lunzer ...................... | 352/196 |
| 3,200,407 | 8/1965 | Nordin ...................... | 352/14 |
| 3,244,469 | 4/1966 | Hennessey et al. ...... | 352/14 |

*Primary Examiner*—S. Clement Swisher
*Attorney*—Pastoriza & Kelly

ABSTRACT: A portable, self-contained movie film sound viewer includes a film transport component for moving film at a continuous rate past a sound-reproducing head, a film-advancing component for moving film intermittently at a variable rate past a viewing aperture, and a film movement sensor located between the film portions passing the sound-reproducing head and viewing aperture. The sensor is biased against the film to monitor film tension and forms a film loop whose optimum length corresponds with synchronous movement between the film portions being viewed and listened to. The sensor coacts with a mechanical servo to automatically correct out-of-phase motions of the film portions by increasing and decreasing the intermittent motion of the film-advancing component as underrunning and overrunning conditions occur. The use of sprockets customarily used for transferring film is eliminated.

INVENTOR:
OTTO R. NEMETH

BY Elliott & Pastoriga

ATTORNEYS

INVENTOR:
OTTO R. NEMETH

BY *Elliott & Pastoriza*

ATTORNEYS

INVENTOR:
OTTO R. NEMETH
BY Elliott & Pastoriga
ATTORNEYS

MOVIE FILM SOUND VIEWER

This invention relates to an audiovisual device and more specifically to a portable, lightweight, motion picture film sound viewer with relatively few components which can be easily operated by the observer.

BACKGROUND OF THE INVENTION

Presently used audiovisual systems for simultaneously displaying motion picture film and transmitting sound from a sound stripe arranged on the film are generally heavy, difficult to operate, and include numerous complex components that require excessive packaging space and are generally separated from one another. Setting up and arranging the components for operation is complicated and time consuming.

Most movie film viewing mechanisms such as projectors, incorporate a plurality of sprockets to transfer film, the sprockets being interconnected and coupled to a common motor. Frequently, irregular or mismatched relative motions of the sprockets exert tension on the film causing it to flutter with the immediate result that viewing is blurred. If the film tension is not relaxed, it can eventually stretch the film to a degree where the sprockets tear and rupture the film perforations. Another adverse condition that frequently arises when sprockets are employed is that the film develops slack which permits the film to become entangled with various components forcing the observer to discontinue his viewing until the problem is manually corrected.

Film portions being viewed and listened to often shift out of phase due to mismatched rotations by the sprockets as mentioned above, vibrations, film shrinkage or enlargement due to thermal changes, and humidity. When these conditions arise, the observer is likely to become confused and irritated and conventional audiovisual devices are unable to overcome these conditions and quickly restore synchronous motion.

BRIEF SUMMARY OF THE INVENTION

Briefly stated, the present invention comprehends a portable, easily operated movie film sound viewer capable of transferring combination motion picture and sound film without employing any sprockets or the like which, as in the case of conventional audiovisual devices, could damage the film and seriously disrupt the viewing and sound effects. The viewer includes a support frame that mounts a film transport means which continuously transports film past a sound-reproducing means, and, a film-advancing means that intermittently advances film past a viewing aperture. The movements of the film portions passing the sound reproducing means and viewing aperture are moved synchronously and are separated by an intermediate film portion. The intermediate film portion constitutes a film loop formed by a film movement sensing means that is biased against the film causing it to project into the space defined by a film cartridge.

The sensing means may be a reciprocable loop-setting probe biased against the film with light tension to establish an optimum film loop size corresponding to synchronous movement of the film portions. The sensing means is coupled to a mechanical servo means which is arranged to correct mismatched movements and achieve synchronous movement between the film portions.

The mechanical servo means may include a variable pulley having a pair of sections defining a variable pulley groove whose diameter is increased and decreased when the sections are moved toward and away from one another. Pulley motion is transmitted to a shutter by way of a drive belt encircling them both. The mechanical servo means includes a link which, in response to rearward or forward probe movements, varies the pulley groove diameter to adjust the shutter rotational rate. The rotational rate of the shutter in turn directly controls the rate at which the film advancing means intermittently advances the film.

The film advancing means includes a shuttle and a claw attached to one end of the shuttle dimensioned for insertion into perforations formed in the film. Movement of the shutter forces the shuttle to move in a pattern forcing the claw to enter a perforation, lift the film to a height substantially equivalent to the length of a picture frame, withdraw from the perforation to release the film, descend to the original position and repeat the cycle until the operator switches off the motor.

The cartridge is formed with a sloped light-diffusing surface for spreading collimated light from a light source located in the support frame to improve illumination and viewing.

The sensing means constantly monitors film tension by measuring the size of the film loop whose length is indicative of whether the film portions being simultaneously viewed and listened to are synchronous or mismatched. When the intermittent movement of the film portion being viewed and the continuous movement of the film portion being listened to shift out of phase then the sensing means will urge the mechanical servo means to vary the pulley groove diameter. When the groove diameter is enlarged then the shutter rotational rate will be increased to thereby automatically increase the rate of the film advancing means and correct underrunning errors. Conversely when the film loop size becomes smaller than the optimum size the mechanical servo means will cause the pulley groove diameter to decrease to correct overrunning errors. The adjusted rate of the film-advancing means continuously and automatically restores the film loop size to its optimum length so synchronous movement will be reestablished.

BRIEF DESCRIPTION OF THE DRAWINGS

The numerous benefits and unique aspects of the present invention will be fully understood when the following detailed description is studied in conjunction with the drawings, in which:

FIG. 9 is a perspective, exploded view showing some important components of the film-advancing means;

FIG. 10 is a side view of the film-advancing means taken along line 10—10 of FIG. 4;

FIG. 11 is a rear elevational view of the shutter and some components of the film-advancing means; and, FIG. 12 is a motion profile showing four basic movements of the film-advancing means as it experiences a complete film-advancing cycle.

DETAILED DESCRIPTION OF THE PREFERRED EMBODIMENT

Figure 1:
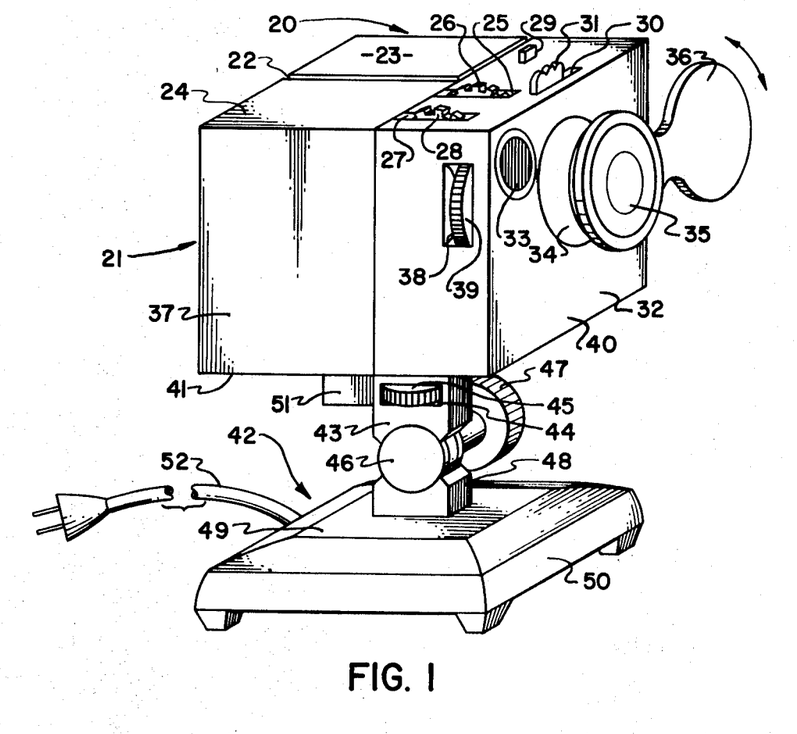
FIG. 1 is a perspective view of the motion picture sound viewer with a film cartridge arranged in position.

Referring now to FIG. 1, a portable, lightweight movie film sound viewer 20 is shown that can be easily operated by an observer to achieve numerous outstanding benefits. Viewer 20 includes a block-shaped housing or support frame 21 for enclosing and mounting the components and assemblies that coact to transfer the film being observed and listened to by the observer. Support frame 21 is formed with a rectangular recess or cartridge receiving slot 22 for receiving a removable cartridge 23 that carries a movie film having a sound stripe. Top wall 24 of support frame 21 has a narrow slot 25 for receiving the top portion of a dial 26 that can be rotated by the observer's fingers to switch on and off a motor (not shown) enclosed by support frame 21. Another narrow slot 27 is shaped to receive the top portion of a manually operated dial 28 for switching an audio circuit off and on. An indicator light 29 projects through top wall 24 to indicate when the audio is turned on. A transverse, narrow slot 30 is sized to receive a finger grip portion of a framer bar assembly 31 that can be shifted from side to side to correct laterally misoriented film.

A front wall 32 mounts a speaker 33 for the audio. In addition, an audio circuit may be provided for attachment to earplugs of a headset (not shown) worn by the observer.

A raised lens assembly 34 mounted on front wall 32 includes a viewing aperture 35 and a rotatable eye shade 36 for blocking vision in the observer's eye that is not looking into aperture 35 in order to prevent the observer from squinting. A sidewall 37 includes a vertical slot 38 for receiving an exposed portion of a dial 39 that the observer can manipulate to manually advance picture frames when dial 26 has been used to turn the motor off. By advancing successive frames manually, the observer can hold them still in order to closely study details. The support frame 21 includes a removable front cover 40 that can be easily withdrawn to gain access inside viewer 20.

Demountably connected to a bottom wall 41 is a stand or base assembly 42 having a connector 43 that may include multiple prongs (not shown) insertable into sockets (not shown) in bottom wall 41. A cavity 44 is formed in connector 43 for retaining a thumb lock 45 which, when the prongs are inserted in the sockets, is screwed upwardly to firmly interlock base assembly 42 and bottom wall 41. Beneath connector 43 is a pivot pin 46 formed with an adjustment wheel 47. Pivot pin 46 is journaled between connector 43 and another connector 48 so that the support frame 21 can be swiveled in a vertical plane to an inclination preferred by the observer. The bottom part of connector 48 is attached to a top plate 49 constituting part of a shallow housing 50 for retaining an electrical recharging circuit. Electrical energy from the recharging circuit is furnished to a battery within support frame 21 through an electrical connector block 51. The recharging circuit may be connected to an external power source through electrical line 52.

Figure 2:
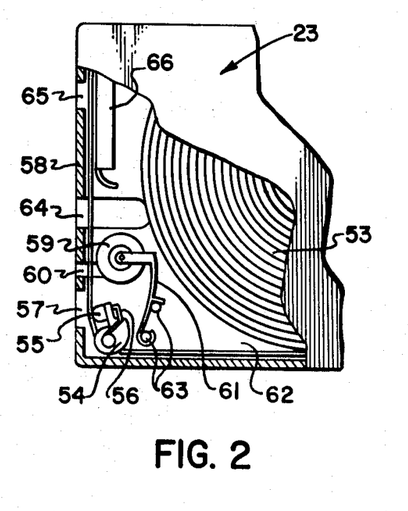
FIG. 2 is a fragmentary view of the film cartridge with a portion of the cover broken away to show an endless loop of motion-picture sound film.

Referring now to FIG. 2, cartridge 23 contains an endless loop film 53 that is preferably super 8 magnetic sound film that is lubricated. As successive portions of film 53 are unwound in a direction indicated by the arrow, the film 53 passes around a roller guide 54 having a smooth tip 55 that is constantly urged by a spring 56 toward an opening 57 formed in cartridge front wall 58. The film is transferred past a larger roller 59 which is constantly urged toward another wall opening 60 by a spring 61 mounted to a cartridge sidewall 62 by a pair of pins 63. After the film passes an opening 64 formed in walls 58 and 62, it is transferred past a viewing opening 65 through an elongated passageway defined by a film guide plate 66 and front wall 58.

Figure 3:
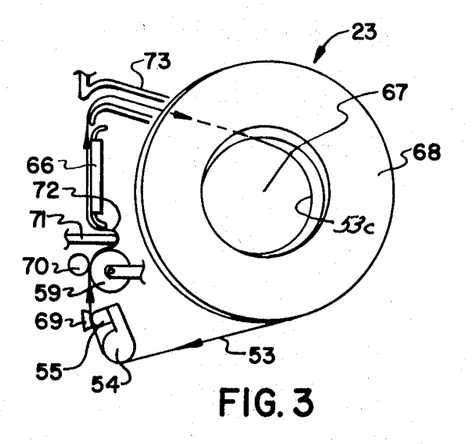
FIG. 3 is a schematic view showing how components of the cartridge and viewer coact to transfer the film.

FIG. 3 is a schematic view showing how components of cartridge 23 coact with components of the viewer to transfer the endless or continuous loop film 53. Film portions 53c recently viewed are pushed by a film-advancing means (not shown) to the inside zone of the film loop and onto an inclined film support surface 67. Surface 67 is inclined toward the front of cartridge 23 so that recently viewed film 53c may be fed under the ring-shaped in body 68 of the film mass. Film portions to be viewed are pulled from film mass ring 68 and pressed against a sound-reproducing means 69 by a smooth tip 55. These portions are pulled at a constant rate by a film transport means 70 such as a capstan against which film 53 is being urged by roller 59. Capstan 70 may be constructed of stainless steel and coated with a suitable commercially available, high-friction inorganic material.

After being fed past capstan 70, film 53 is engaged by a film movement sensing means 71 to form a film loop 72 the purpose of which will be fully described. Film loop 72 is sized to provide enough slack so that film portions being transported at a continuous rate past sound-reproducing means 69 and film portions being advanced at an intermittent rate past the viewing aperture move simultaneously and synchronously. After passing the viewing aperture and film guide plate 66, the film is pushed through a film guide channel 73 for return to the inside zone of the film mass ring 68. It shall be fully explained later in this description how the film portion being viewed is advanced intermittently as the film portion being heard is transported at a continuous rate so that corresponding pictures and sounds will be properly sensed by the observer.

Conventional cartridges loaded with continuous loop motion picture film confine the film within a small space. The space is normally annular or circular and provides insufficient expansion space for the film with the adverse result that multiple loop sections eventually spread outwardly into contact with and become tightened against the surrounding cartridge wall portions. As a consequence, the expanded loop sections become scratched and torn. Operation of the viewer must be discontinued until the film is untangled and repaired or replaced. Various ambient conditions greatly influence film loop behavior causing it to spread and contract rather unpredictably. Moisture, for example, often makes the inside film sections tighten against one another while the outside film loop sections are permitted to become loose and then damaged by surrounding cartridge walls. Other factors that contribute to film behavior are film lubrication, emulsion, thickness and width as well as temperature and dust.

When, as in the case of the present invention, a portion of the continuous loop film is to form a film loop, such as film loop 72 shown in FIG. 3, the film loop tends to develop into a preformed loop when it remains motionless for a sufficient period of time. When the cartridge is left in the viewer for a long period of time, for example, and the viewer is not operated then the film section engaged by the film movement sensing means 71 tends to stiffen into a set shape. When the viewer is finally operated, the preformed loop may reappear in the form of a wiggle or wave on the inside loop zone of ring 68. When this occurs, the wiggle will gradually deform or collapse inwardly where the film is forced to bunch or pileup. Viewing must be discontinued until the film becomes untangled, flattened out, and rewound.

Figure 3A:
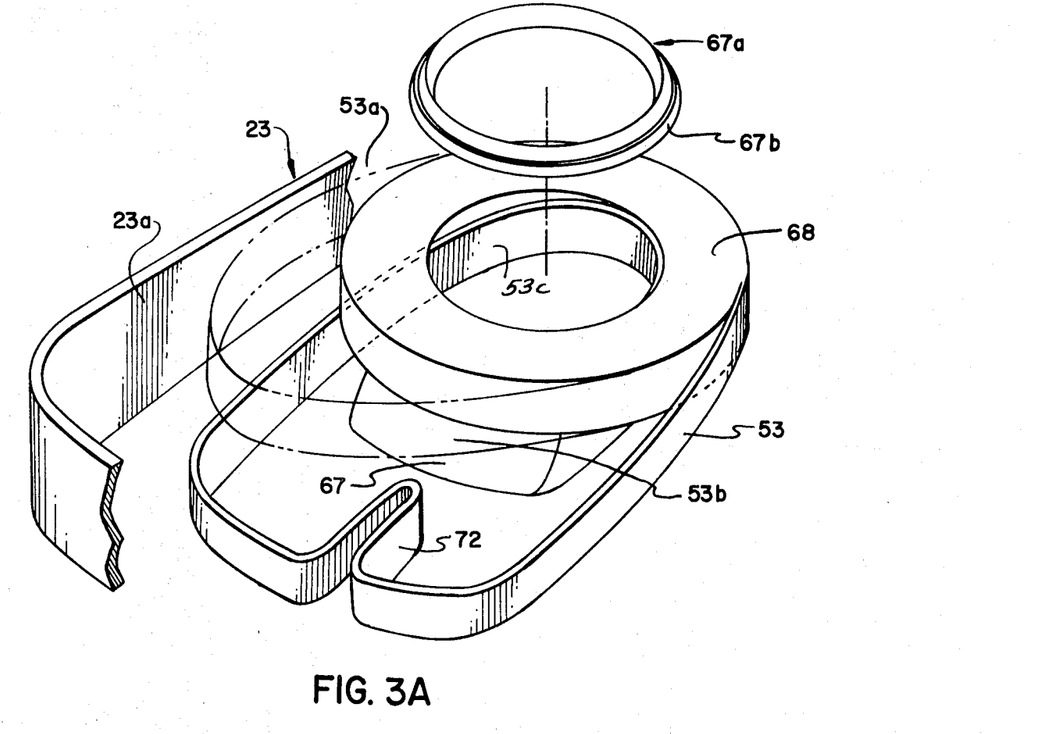
FIG. 3A is a perspective, partially exploded view showing the continuous loop film.

Referring now to FIG. 3A it will be understood how both of the above problems i.e., scratching and tearing of expanding film sections and bunching and entangling of inwardly collapsing film sections, are overcome by the present invention. As previously explained between the point where film 53 is being pulled from the outside zone of film mass ring 68 and the point where it is being pushed onto the inside zone of film mass ring 68, film loop 72 is formed. In order to permit maximum expansion room for film 53, a film transfer envelope 53a is provided which is defined by film support surface 67, on which film mass ring 68 rests, and surrounding wall portions of cartridge 23 which portions are represented by a wall 23a. Envelope 53a is sized to allow film 53 to freely expand outwardly without making frictional engagement with surrounding cartridge wall portions 23a.

It has been determined from experiments that the envelope will be of an adequate size when it is described by an average width equivalent to the given outer diameter of ring 68 plus at least 25 percent of the given outer diameter of ring 68. As indicated by cartridge wall portion 23a, the cross section of envelope 53a is preferably rectangular. The dot-dash line 53b shows an outer loop section freely expanding within envelope 53a without being able to frictionally engage surrounding cartridge wall portion 23a.

In order to prevent preformed loop sections of film 53 from collapsing inwardly from the inner loop zone of ring 68, a floating cartridge ring 67a is positionable on film support surface 67. When preformed loop sections begin to deform and collapse inwardly the outer periphery of cartridge ring 67a blocks further deformation. The bottom wall of cartridge ring 67a is formed with a radially outwardly projecting spacer foot 67b that is shaped to slide against the film perforation side. Spacer foot 67b prevents other film portions, such as the sound stripe and picture frames, from contacting and becoming scratched by ring 67a.

Figure 4:
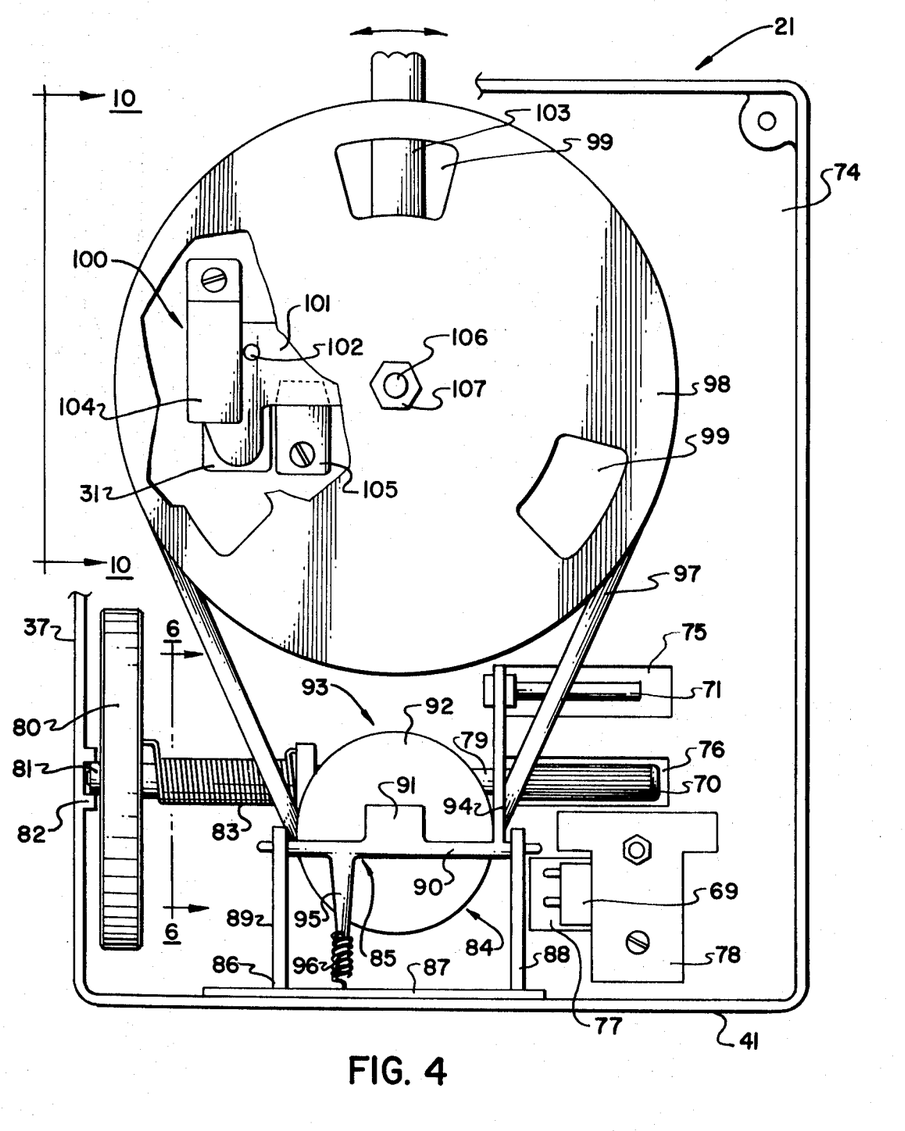
FIG. 4 is a front elevational view of the viewer when a front cover is removed showing some of the important subassemblies.

FIG. 4 is front view of the support frame 21 with the front cover 70 (shown in FIG. 1) removed. Support frame 21 is integrally formed with a transverse wall or partition 74 having an opening 75 for accommodating the film movement sensing means 71, an opening 76 below opening 75 for accommodating the film transport means 70 which may be a capstan, and a lower opening 77 for accommodating sound-reproducing means 69. Sound-reproducing means 69 is fastened to partition 74 by a bracket 78. Film transport means 70 is fastened to one end of a horizontally extending sound shaft 79 whose other end is rigidly fixed to a flywheel 80. Sound shaft 79 extends through flywheel 80 and is journaled in a ballbearing assembly 81 resting in a recessed bearing section 82 of sidewall 37. A torsion spring 83 connects flywheel 80 with a gear (not shown) for a purpose to be fully described.

Connected to film movement sensing means 71 is a mechanical servo means 84 which, as shall be fully described, operates to correct mismatched movements between film portions passing the sound-reproducing means 69 and the viewing aperture (not shown). Mechanical servo means 84 includes a link means 85 having a yoke 86. Yoke 86 incorporates a cross plate 87 attached to bottom wall 41 and a pair of upstanding arms 88 and 89 whose top ends are formed with recesses to receive the opposing ends of a transversely aligned rocking bar 90. Rocking bar 90 is integrally formed with a cam 91 constantly biased against a half section 92 of a variable pulley 93. An upstanding integral rod 94 extending from one end of rocking bar 90 is connected at its top portion to film movement sensing means 71. Depending from rocking bar 90 is an extension 95 interconnected to plate 87 by a helical spring 96. The energy of spring 96 is used to constantly bias film movement sensing means 71 against the film to constitute a film loop (as shown in FIG. 3).

Variable pulley 93 is coupled is by a flexible drive belt 97 to a rotatable shutter 98 having shutter openings 99 through which the observer may view the film as openings 99 coincide with the viewing aperture. Coupled to partition 74 adjacent the inside face of shutter 98 is a film-advancing means 100 that is only partially shown. Film-advancing means 100 includes a shuttle 101 pivoted to the framer bar assembly 31 by a pivot pin 102. An upright lever portion 103 of t he framer bar assembly terminates in a finger grip that the observer can shift from side to side as indicated by the arrow to correct laterally misoriented film. A depending spring 104 mounted to partition 74 is biased against shuttle 101 and an upright leaf spring 105 is biased against the framer bar assembly 31 to urge these components in a manner to be fully described in conjunction with FIGS. 9, 10, 11 and 12. Many of the film-advancing means components and shutter 98 are positioned on a stackup shaft 106 and held in proper alignment by a fastener 107.

Figure 5:
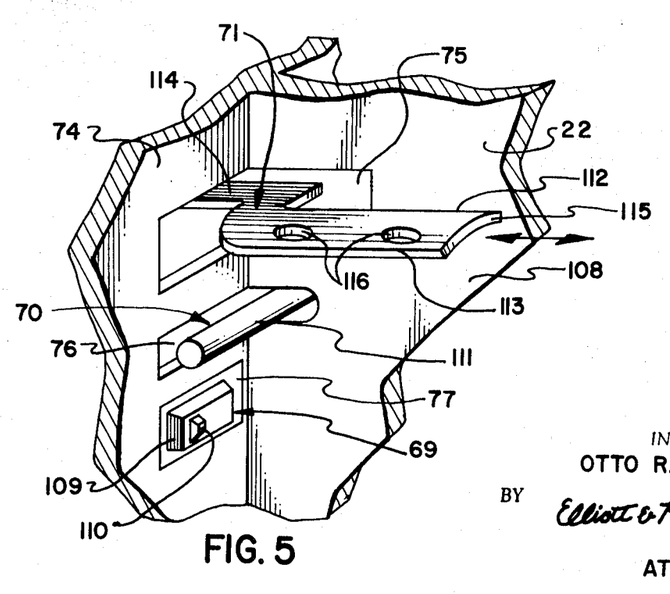
FIG. 5 is a perspective view of the forward end of a cartridge-receiving slot showing sensing means, film transport means, and, sound-reproducing means.

Referring now to FIG. 5, the transverse partition 74 and a longitudinally extending wall 108 partially define cartridge-receiving slot 22. Sound-reproducing means 69 includes a sound reproduction assembly 109 having a pickup head 110 and, as previously mentioned, the film transport means 70 may be a capstan 111. Oriented in slot 75 is film movement sensing means 71 which may be loop setting probe 112 movable as indicated by the arrow. Probe 112 has a forward section 113 connected to an offset rearward section 114 connected at its rearward end to upstanding rod 94 shown in FIG. 4. The leading edge 115 is of concave shape so as to contact only the edges of the film. Plural weight reduction holes 116 are formed in probe 112. Probe 112 is constantly biased against the film to monitor the size of film loop 72 (shown in FIG. 3) and restore the loop size to a predetermined optimum film loop size corresponding to the desired synchronous movement between the film portions passing sound-reproducing means 69 and the viewing aperture (not shown). The manner in which probe 112 cooperates with the mechanical servo means and other components shall be fully explained.

Figure 6:
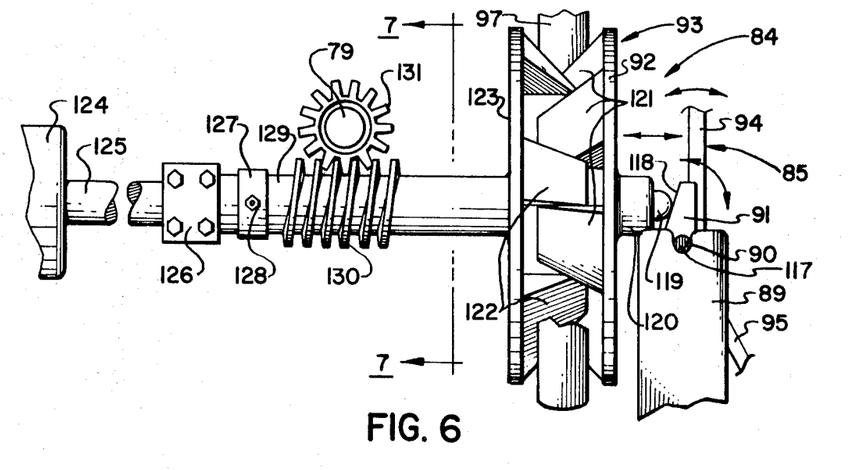
FIG. 6 is a side elevational view taken along lines 6—6 of FIG. 4 showing some of the important subassemblies.

FIG. 6 shows how link means 85 and mechanical servo means 84 cooperate to assist in transferring the motion picture film in the desired manner. One end of rocking bar 90 is cradled within a recess 117 formed in the top portion of upstanding arm 89. Cam 91 is formed with a sloped surface 118 that is constantly biased against a cam follower 119 which may be a ball retained in a socket formed in a hub 120 fixed to the outer pulley half section 92. Pulley section 92 is integrally formed with circumferentially spaced beveled teeth 121 that are alternately arranged relative to similarly shaped beveled teeth 122 integrally formed on an inner pulley half section 123. Teeth 121 and 122 taper toward one another and a common center to define a V-shaped pulley groove. The diameter of the pulley groove can be varied when pulley half section 92 becomes axially displaced by sliding in directions indicated by the arrow. Pulley half section 92 is urged by a resilient element (not shown) so as to constantly thrust ball 119 into engagement with cam surface 118. It can be seen that when the film movement sensing means is retracted to diminish the film loop, rod 94 rocks in a clockwise direction causing cam 91 to likewise rock in a clockwise direction with the result that pulley half section 92 will follow cam 91 and cause the pulley groove diameter to diminish. The important effect of this movement shall be explained later.

A battery powered motor 124 is connected to a drive shaft 125 that, at an intermediate point along its length, is journaled within a bracket 126 secured to the support frame. A collar 127 and set screw 128 may be used to secure a sleeve 129 to drive shaft 125 whose extreme end is fixed to pulley half section 123. Integrally formed with sleeve 129 is a worm gear 130 that is interengaged with the teeth of a gear 131 which encloses sound shaft 79. Sound shaft 79 and drive shaft 125 are aligned in mutual perpendicular relationship.

When the film loop size decreases relative to the optimum loop size, then the sensor moves outwardly causing rod 94 and cam 91 to rock in a clockwise direction. Since pulley half section 92 is urged to follow cam 91, the pulley half sections are moved apart from one another to automatically diminish the pulley groove diameter. As shall be explained this automatically causes the film-advancing means to advance the film portion being viewed at a slower intermittent rate until the film loop optimum size is restored.

Figure 7:
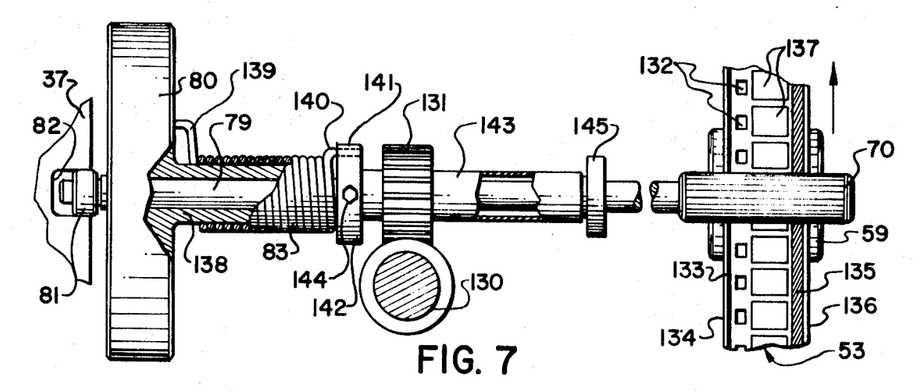
FIG. 7 is a side view taken along line 7—7 of FIG. 6.

Referring now to FIG. 7 film transport roller 59 is shown in its biasing position pressing the combination film 53 against capstan 70. As previously mentioned film 53 may be super 8 magnetic sound film having perforations 132 and a balance stripe 133 on its inner edge 134 and a magnetic sound stripe 135 on its outer edge 136. The picture frames 137 move in the direction indicated by the arrow. Capstan 70 may be constructed of stainless steel and is rigidly secured to sound shaft 79 which is tightly pressed into an integral hub 138 extending from flywheel 80. The adjacent end of sound shaft 79 is secured within ballbearing assembly 81 mounted in a recessed bearing section 82 in the housing sidewall 37.

Flywheel 80 is coupled to gear 131 by torsion spring wrapped around sections of sound shaft 79 and hub 138. One end 139 of torsion spring 83 is fixed to flywheel 80 while its other end 140 is anchored in a socket portion 141 of a collar 142 that is connected to a sleeve portion 143 of gear 131 by a conventional set screw 144. This coupling arrangement between gear 131 and flywheel 80 operates to dampen out jerky and erratic movements transmitted by the worm gear 130 so that capstan 70 will always rotate at a smooth, continuous rate to thereby assure excellent sound quality. Torsion spring 83 is a compliance device which absorbs energy so that uneven, irregular movements of worm gear 130 that may be caused by motor behavior or vibrations are smoothed out and cannot be transmitted to the capstan 70. The other end of sleeve 143 is journaled in a ballbearing assembly 145. Sleeve 143 and gear 131 are separated from sound shaft 79 at all adjacent points by a running clearance sufficient to assure that the desired smooth rotation of sound shaft 79 will not be interfered with.

Figure 8:
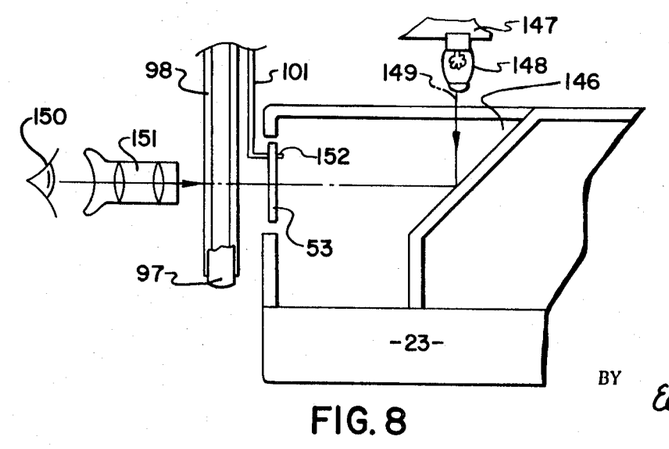
FIG. 8 is a schematic view showing the film being viewed by an observer and advanced by film-advancing means.

FIG. 8 is a fragmentary schematic view showing a sloped light diffusing plate 146 integrally formed with cartridge 23. Mounted to a wall section of the viewer housing is a lensed bulb 148 emitting a collimated light beam 149 onto diffuser plate 146 that in turn evenly distributes illumination upon the film 53 being viewed by the eye 150 of an operator through a conventional lens system 151. As shall be explained in detail, rotational movement of the shutter 98 caused by the flexible band 97 forces shuttle 101 to oscillate in a pattern so that a claw 152 fixed to the end of shuttle 101 advances film 53 at the desired rate.

Figures 9, 10, 11, 12:
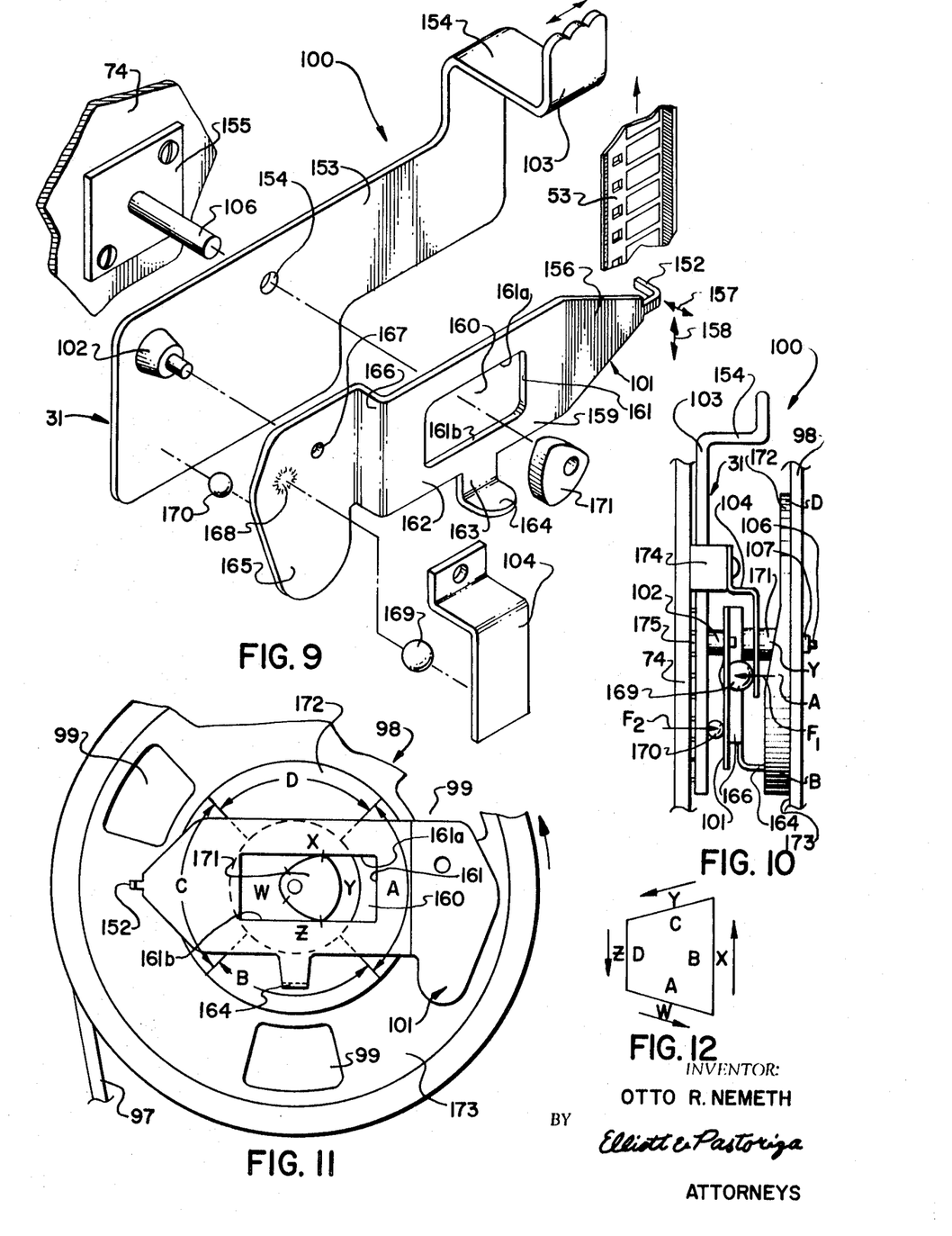

Referring now to FIG. 9, an exploded view is shown of some of the key components that constitute the film-advancing means 100 for intermittently advancing film 53 past the viewing aperture. Framer bar assembly 31 is integrally formed with a flat main body 153, a bridge portion 154 and an upright level portion 103 that the operator can manipulate to shift misaligned motion picture frames into proper viewing alignment. Framer bar assembly 31 includes a pivot pin 102 and an opening 154 shaped to slip over stackup shaft 106 fixed to a plate 155 that is connected to viewer housing wall partition 74.

Coupled between the framer bar assembly and leaf spring 104 is shuttle 101 dimensioned and mounted to move in a floating and oscillating pattern to assist in moving film 53. One end 156 of shuttle 101 tapers and terminates in a claw 152 oriented perpendicularly relative to the plane of the shuttle main body. As shall be explained, the shuttle 101 operates to move claw 152 in and out as shown by arrow 157 as well as up and down as shown by arrow 158. The claw cycle of motion for advancing successive frames is characterized by moving from a retracted position into a film perforation, lifting the film through a distance equivalent to approximately the length of one frame, withdrawing from the perforation to release the film and descending to its original retracted position from which point the cycle can be repeated. A central portion 159 of shuttle 101 is formed with a window 160 whose upper edge 161a and lower edge 161b together serve as a cam follower 161. Depending from a strip 162 beneath window 160 is a lug 163 that terminates in a projecting rounded cam follower 164. The central body 159 is integrally connected to a mounting wall 165 by an intermediate wall 166 aligned perpendicularly to the central body 159 and mounting wall 165. The mounting wall 165 is formed with a pivot opening 167 sized for placement over the pivot pin 102 and a dimple or socket 168 that serves as a bearing surface for a ballbearing 169 designed to make rolling contact with spring 104. Another ballbearing 170 is designed to fit between and make rolling contact with framer bar assembly 31 and the shuttle mounting wall 165. As shall be fully explained, an eccentric heart-shaped cam 171 secured to the inner face of the shutter projects through the window 160 to control the vertical movement 158 of the shuttle 101.

FIG. 10 is a view taken along line 10—10 of FIG. 4 showing the interrelationship of the shutter 98 and film advance mechanism 100. It can be seen that shuttle 101 is pivotally mounted on the pivot pin 102 and is floatingly mounted between the framer bar assembly 31 and spring 104 by balls 169 and 170 that are vertically and horizontally offset from one another. The eccentric cam 171 is integrally formed with or rigidly connected to a ring cam 172 having a shallow arc segment D, a raised arc segment B, and an intermediate sloped arc segment A. The important functions of the eccentric cam 171 and ring cam 172 in urging shuttle 101 through the desired motion pattern will be fully described in conjunction with FIG. 11. Ring cam 172 is connected to the inner face 173 of shutter 98.

Framer bar assembly 31, shuttle 101, eccentric cam 171, ring cam 172 and shutter 98 are all coaligned and retained on stackup shaft 106 to which a fastener 107 is attached. Spring 104 is secured by a mounting block 174 to the viewer housing partition 74 and is biased to urge ball 169 against shuttle 101 with a force $F_1$. In reaction to force $F_1$, ball 170 urges cam follower 164 into constant sliding engagement with ring cam 172. The biasing force $F_2$ is sufficient to urge the cam follower 164 against all the variable height portions of ring cam 172.

A pad 175 having a series of molded ribs is arranged between partition 74 and the rear wall of framer bar assembly 31 to minimize friction and permit the operator to easily swing the bar assembly to a position corresponding to proper frame alignment.

FIG. 11 is a view of the inner face 173 of shutter 98 showing only shuttle 101 arranged in operative relationship with the dual cam arrangement consisting of cam 171 and cam 172 which are rigidly united together. Eccentric cam 171 which projects entirely through window 160 controls the vertical or up-and-down movement of claw 152. The ring cam 172 which is constantly in contact with cam follower 164 controls the horizontal or in and out movement of claw 152. The ring cam 172 is divided into four arcuate segments consisting of a sloped arcuate segment A, a flat raised arcuate segment B, another sloped arcuate segment C and a relatively flat, shallow arcuate segment D. When shutter 98 rotates counterclockwise as indicated by the arrow, it can be seen the cam follower 164 is raised when sliding over segment B, moves from a raised to a lower position when sliding over segment C, is in a relatively lower position when sliding over segment D and moves from a lower to a raised position when sliding over segment A. For purposes of illustration, arcs A, B, C and D may be in the order of 85°, 100°, 85° and 90° respectively.

Eccentric cam 171 is divided into four peripheral segments W, X, Y and Z which, for purposes of explanation, may be regarded as corresponding with ring cam 172 segments A, B, C and D respectively. When peripheral segment Y is engaging cam follower edge 161a then shuttle 101 will b lifted to its maximum elevation. When peripheral segment W is engaging cam follower edge 161a, peripheral segment Y will be pushing down on cam follower edge 161b forcing shuttle 101 to be at its lowest height. As peripheral segment Z engages cam follower 161a shuttle 101 will be gradually lowered and when peripheral segment X engages the cam follower 161a shuttle 101 will be gradually raised.

Referring now to FIGS. 11 and 12 it can now be understood that ring cam 172 and eccentric cam 171 are arranged relative to shuttle 101 so that as arcuate segment A is slid beneath cam follower 164 peripheral segment W engages cam follower 161a with the result that claw 152 is moved from a retracted position to a point where it is inserted into a film perforation. As cam follower 164 slides over arcuate segment B and the peripheral segment X slides over cam follower 161a, the claw 152 raises the film through a distance corresponding to the length of one motion picture frame. As arcuate segment C slides beneath cam follower 164 and peripheral segment Y slides over the cam follower 161a the claw 152 is withdrawn from the perforation to a retracted position above the starting point. When arcuate segment D slides beneath the cam follower 164 and peripheral segment Z slides over the cam follower 161a the claw 152, remaining in a retracted position, descends to the starting point. These four movements complete one film-advancing cycle which is repeated until terminated by the operator. The rate at which the shuttle 101 intermittently advances successive frames depends on the rotational rate of shutter 98. As shall be fully explained in the operation description, decreasing and increasing the shuttle speed to prevent overrunning and underrunning by the film is achieved by decreasing and increasing the shutter rotational rate.

OPERATION

The superior advantages of the present invention can be enjoyed in numerous ways. Conventional motion picture film having an associated sound stripe must be viewed by equipment employing a bulky, relatively complex projector that focuses film on a screen and one or more speakers located externally of the projector. If movies are to be shown in the home, furniture must be shifted around and rearranged. Movie viewing or projector rooms are often inaccessible or situated at inconvenient locations. The present invention overcomes the burdens posed by the above circumstances. Viewer 20 may being interchangeably used for domestic, educational, commercial or military purposes and only minimal preparations are required. Viewer 29 operates with great reliability and any difficulties that arise are automatically self-corrected.

Viewer 20 is an audiovisual training and education device that a person with only minimal manual dexterity and technical experience can easily operate. Viewer 20 allows the observer to enjoy the audiovisual effects in absolute privacy without any interference from another person or a group. As previously mentioned, the audio system may be wired to a set of earphones for the observer. Medical information concerning sensitive topics may be learned and fully grasped by a person who otherwise, if required to join a group or confront a doctor, might be embarrassed or annoyed and therefore incapable of learning information.

Initially the observer will select a cartridge containing a film carrying information sought to be learned and insert the cartridge in the viewer. The base assembly 42 is placed upon a foundation and adjustment wheel 47 manipulated until viewer 20 is pivoted to the desired viewing inclination. The observer then rotates eyeshade 36 until it blocks vision in the eye not intended to look through viewing aperture 35. When manipulation of dial 26 turns on the motor and dial 28 turns on the audio, the observer is ready to simultaneously view the motion picture film and listen to sounds from the sound stripe. With cartridge 23 in its viewing position, tip 55 will be biased against sound-reproducing means 69, roller 59 will be biased against film transport means 70 and film movement sensing means 71 will automatically establish the optimum size film loop 42 (see FIG. 3). So long as the optimum predetermined film loop size 72 remains established the film portion being moved at a constant rate past sound-reproducing means 69 and the film portion being intermittently advanced by the film-advancing means 100 will be moving in perfect synchronous movement.

In the event that the film portion being viewed starts to overrun and thereby cause mismatched motion relative to the film portion being listened to, the resulting excessive tension of film loop 72 will be quickly sensed and automatically force the film movement sensing means 71 to a retracted or outer position. However, the error or imbalance of motion between the film portions will be quickly self-corrected. Referring to FIG. 6, the retracted movement of film movement sensing means 71 causes upstanding rod 94 and cam 91 to rock in a clockwise direction. Pulley half section 92 is biased to follow cam 91 and therefore the pulley groove diameter of variable pulley 93 becomes diminished. As a result, drive belt 97 causes shutter 98 to rotate at a decreased rate. Since the intermittent movement rate of shuttle 101 is a direct function of the rotational rate of shutter 98, shuttle movement is slowed down and therefore the rate of film advancement is also slowed down. The overrunning condition becomes entirely corrected when film tension is relaxed to a degree where the optimum loop size is restored. It should be noted that mismatched motion conditions between the film portions are always corrected by modifying the film advancement rate rather than the film transport rate which is always constant.

If the film portion being viewed experiences an underrunning condition, then there will be relaxed film tension and a slight slack build up that will result in inward or extended movement by film movement sensing means 71 to enlarge the size of film loop 72. Cam 91 will press pulley half section 92 towards pulley half section 123 to develop an enlarged pulley groove diameter. With additional drive belt material passing around pulley 93 for a given rotation of drive shaft 125 the shutter rotational rate will be increased. As a direct result, the intermittent motion rate of shuttle 101 will likewise be increased until sufficient tension is restored in the film to automatically return the film loop size to the optimum size.

Because the film portion being viewed is advanced intermittently, film movement sensing means 71 is constantly wiggling back and forth through a slight displacement. Severe mismatched motion may be caused by vibrations, motor irregularities or film shrinkage or expansion due to temperature changes or humidity.

When the film progresses to a stage that the observer would like to study in close detail, he merely shuts off the motor and audio and moves the frames ahead slowly one at a time by manipulating dial 39.

From the foregoing it will be evident that the present invention has thus provided a movie film sound viewer in which all of the various advantages are fully realized.

What is claimed is:

1. A cartridge for containing continuous loop motion-picture film comprising:
   a. a cartridge wall portion;
   b. a film support surface;
   c. a film transfer envelope defined by the cartridge wall portion and film support surface, the envelope being sufficiently large to allow the film to freely expand outwardly without making frictional engagement with surrounding cartridge wall portions; and
   d. a floating cartridge ring positioned on the film support surface, the ring being arranged to prevent preformed loop sections from collapsing inwardly and bunching in the center of the film mass,
      wherein, the film transfer envelope is at least 25 percent larger than the volume occupied by the film mass, the film main body is ring shaped and has a given outer diameter, and, the average width describing the envelope is equivalent to the given outer diameter plus at least 25 percent of the given outer diameter.

2. The structure according to claim 1 including;
   a radially outwardly projecting spacer foot formed on one end of the floating cartridge ring, the foot being shaped to slide against a film perforation side and prevent the floating cartridge ring from contacting and scratching other film portions.

3. A motion-picture sound viewer for transferring a motion-picture film including a sound stripe thereon, comprising:
   a. a support frame;
   b. a shutter rotatably mounted to the frame;
   c. sound-reproducing means connected to the frame;
   d. film transport means for continuously transporting film past the sound-reproducing means;
   e. a viewing aperture formed in the frame;
   f. film-advancing means for intermittently advancing film past the viewing aperture, the film-advancing means including a shuttle, a claw attached to the shuttle dimensioned for insertion into film perforations, the shuttle being movable in a pattern forcing the claw to enter a perforation, lift the film through a height substantially equivalent to the length of a picture frame, withdraw from the perforation to release the film, descend to the original point, and repeat the cycle to intermittently advance the film;
   g. a movable loop-setting probe located between the film transport means and film-advancing means, the probe being biased against the film to sense relative movement of the film portions passing the sound-reproducing means and viewing aperture and establish an optimum film loop size corresponding to synchronous movement of said film portions;

h. mechanical servo means coupled to the loop-setting probe for correcting mismatched movements and achieving synchronous movement between said film portions, the mechanical servo means including, i. a variable pulley having a pair of sections defining a pulley groove whose diameter becomes increased and decreased when the sections are moved toward and away from one another respectively, the pulley being coupled to the shutter by a drive belt encircling them both, j. link means responsive to probe movements for varying the pulley groove diameter, wherein variations of the pulley groove diameter automatically vary the intermittent rate of movement of the shuttle to restore synchronous movement between said film portions;

k. a motor connected to the support frame;

l. a motor shaft connected to the variable pulley;

m. a first gear fixed to the motor shaft;

n. a sound shaft attached to the film transport means;

o. a second gear connected to the sound shaft; the first and second gears being interengaged so that the variable pulley and sound shaft rotate simultaneously;

p. a flywheel fixed to the sound shaft;

q. a torsion spring interconnecting the flywheel and second gear so that jerky and irregular movements transmitted to the second gear are dampened to allow the sound shaft and sound-reproducing means to rotate smoothly; and, wherein the film-advancing means includes;

r. means forming a window through the shuttle, s. a first cam follower defined by one edge section of the window, t. a second cam follower attached to the shuttle, and, u. a dual cam fixed to the inner wall of the shutter, the dual cam including a first cam including a first cam and second cam that coact with the first and second cam followers respectively to assist in moving the shuttle.

4. The structure according to claim 3 wherein;

the first cam is an eccentric cam projecting through the window so that its periphery can be slid against the first cam follower to oscillate the shuttle in a vertical direction, the second cam is a ring cam oriented around the first cam and formed with relatively raised and shallow arcuate segments separated by sloped, intermediate arcuate segments, the segments being arranged to slide against the second cam follower to oscillate the shuttle in a horizontal direction, so that the combined oscillating movements force the claw to intermittently advance the film, and, the probe, link means, and variable pulley are relatively arranged so that when the film loop becomes shorter than the optimum film loop size, the probe becomes displaced outwardly causing the link to decrease the pulley groove diameter which automatically operates to decrease the film advancement rate until desired synchronous movement is restored, and, when the film loop becomes longer than the optimum film loop size the probe becomes displaced inwardly causing the link to increase the pulley groove diameter which automatically operates to increase the film advancement rate until the desired synchronous movement is restored.

5. The structure according to claim 3 including;

a cartridge recess defined by the support frame;

a removable cartridge positionable in the recess;

an endless loop motion picture film with a sound stripe thereon contained in the cartridge;

a first biasing element for urging the film into engagement with the film transfer means;

a second biasing element for urging the sound stripe into engagement with the sound-reproducing means; and, a sloped light-diffusing surface defined by a cartridge portion for spreading light from a light source located in the support frame to improve illumination and viewing.

6. The structure according to claim 5 including:

a film support surface;

a film transfer envelope defined by the film support surface and a cartridge wall portion, the envelope being sufficiently large to allow the film to freely expand outwardly without making frictional engagement with surrounding cartridge wall portions, the envelope being at least 25 percent larger than the volume occupied by the film mass; and, a floating cartridge ring positioned on the film support surface, the ring being arranged to prevent preformed loop sections from collapsing inwardly and bunching in the center of the film mass.

7. A motion picture sound viewer for transferring a motion picture including a sound strip thereon, comprising:

a. a support frame;

b. sound-reproducing means connected to the frame;

c. film transport means for continuously transporting film past the sound reproduction producing means;

d. a viewing aperture formed in the frame;

e. film-advancing means for intermittently advancing film past the viewing aperture;

f. a shutter rotatably mounted to the frame to operate the film-advancing means;

g. film movement sensing means located between the film transport means and film-advancing means to sense relative movement of the film portions passing the sound-reproducing means and viewing aperture, the sensing means including a movable loop-setting probe biased against the film to establish an optimum film loop size;

h. mechanical servo means coupled to the film movement sensing means for correcting mismatched movements of the film and achieving synchronous movement between said film portions, the mechanical servo means including a variable pulley having;

h 1. a pair of sections defining a pulley groove whose diameter becomes increased and decreased when the sections are moved toward and away from one another respectively, the pulley being coupled to the shutter by a drive belt encircling them both, and, h 2. link means responsive to probe movements for varying the pulley groove diameter;

wherein variations of the pulley groove diameter automatically vary the intermittent rate of movement of the film-advancing means to automatically restore synchronous movement between said film portion wherein the link means h 2 includes:

i. a yoke;

j. a rocking bar pivotally connected to the yoke;

k. a rod extending from the bar into engagement with the probe; and, l. a cam formed on the bar biased against one of the variable pulley sections, wherein when film loop sizes shorter than the optimum size occur the cam is moved away from the pulley to decrease the pulley groove diameter, and, when film loop sizes longer than the optimum size occur the cam is moved toward the pulley to increase the pulley groove diameter.

8. The structure according to claim 7, wherein; the probe, link means, and variable pulley are relatively arranged so that, when the film loop becomes shorter than the optimum film loop size the probe becomes displaced outwardly causing the link to decrease the pulley groove diameter which automatically operates to decrease the film advancement rate until desired synchronous movement is restored and, when the film loop becomes longer than the optimum film loop size the probe becomes displaced inwardly causing the link to increase the pulley groove diameter which automatically operates to increase the film advancement rate until the desired synchronous movement is restored.

9. The structure according to claim 7 including;

a dial mounted to the support frame for permitting the observer to manually advance picture frames.

10. The structure according to claim 7 including:

a demountable stand connected to a bottom wall portion of the support frame; and, a manually adjustable wheel for tilting the support frame to the desired viewing inclination.

11. A motion picture sound viewer for transferring a motion picture film including a sound stripe thereon, comprising:
   a. a support frame;
   b. a shutter mounted to the frame;
   c. sound-reproducing means connected to the frame;
   d. film transport means for continuously transporting film past the sound-reproducing means;
   e. a viewing aperture formed in the frame;
   f. film-advancing means for intermittently advancing film past the viewing aperture;
   g. film movement sensing means arranged to sense relative movement of the film portions passing the sound-reproducing means and viewing aperture;
   h. a shuttle formed centrally with a window;
   i. a claw attached to the shuttle dimensioned for insertion into film perforations, the shuttle being movable in a pattern forcing the claw to enter a perforation, lift the film through a height substantially equivalent to the length of a picture frame, withdraw from the perforation to release the film, descend to the original point, and repeat the cycle to intermittently advance the film;
   j. a first cam follower defined by one edge section of the window;
   k. a second cam follower attached to the shuttle;
   l. a first cam fixed to the inner wall of the shutter and characterized by an eccentric cam projecting through the window so that its periphery can slide against the first cam follower to oscillate the shuttle in a vertical direction;
   m. a second cam fixed to the inner wall of the shuttle and characterized by a ring cam oriented around the first cam and formed with relatively raised and shallow arcuate segments separated by sloped intermediate arcuate segments, the segments being arranged to slide against the second cam follower to oscillate the shuttle in a horizontal direction so that the combined oscillating movements force the claw to intermittently advance the film;
   n. a leaf spring mounted to the support frame;
   o. a framer bar assembly pivotally mounted to the support frame and laterally spaced from the leaf spring;
   p. a pivot pin mounted on the framer bar assembly dimensioned for insertion into an opening in the shuttle at a location on the side of the window opposite the side where the claw is positioned;
   q. a first ball retained between the shuttle and framer bar assembly at a location adjacent the pivot pin; and,
   r. a second ball retained between the shuttle and leaf spring adjacent the first ball, the balls being arranged to permit floating movement by the shuttle and urge the second cam follower into sliding engagement against the ring cam.

12. A motion-picture sound viewer for transferring a motion-picture film including a sound stripe thereon, comprising:
   a. a support frame;
   b. a shutter mounted to the frame;
   c. sound-reproducing means connected to the frame;
   d. film transport means for continuously transporting film past the sound-reproducing means;
   e. a viewing aperture formed in frame;
   f. film-advancing means for intermittently advancing film past the film viewing aperture;
   g. film movement sensing means arranged to sense relative movement of the film portions passing the sound-reproducing means and viewing aperture;
   h. a cartridge recess defined by the support;
   i. a removable cartridge positionable in the recess;
   j. an endless loop motion picture film with a sound stripe thereon contained in the cartridge;
   k. a first biasing element for urging the film in engagement with the film transfer means;
   l. a second biasing element for urging the sound stripe into engagement with the sound-reproducing means;
   m. a film support surface in the cartridge, the film support surface and a cartridge wall portion defining a film transfer envelope that is sufficiently large to allow the film to freely expand outwardly without making frictional engagement with surrounding cartridge wall portions; and,
   n. a floating cartridge ring positioned on the film support surface, the ring being arranged to prevent preformed loop sections from collapsing inwardly and bunching in the center of the film mass.

13. The structure according to claim 12 wherein; a light diffusing surface is defined by a portion of the cartridge for spreading light from a light source to improve illumination and viewing.

14. The structure according to claim 13 wherein; the diffusing surface is aligned with the viewing aperture and is sloped at approximately 45°, and the light emanates from a collimated light source located in the support frame.

15. The structure according to claim 12 including:
   a radially outwardly projecting spacer foot formed on one end of the floating cartridge ring, the foot being shaped to slide against the film perforation side and prevent the floating cartridge ring from contacting and scratching other film portions.

16. A motion picture sound viewer for transferring a motion picture including a sound stripe thereon, comprising:
   a. a support frame;
   b. sound-reproducing means connected to the frame;
   c. film transport means for continuously transporting film past the sound reproduction producing means;
   d. a viewing aperture formed in the frame;
   e. film-advancing means for intermittently advancing film past the viewing aperture;
   f. a shutter rotatably mounted to the frame to operate the film-advancing means;
   g. film movement sensing means located between the film transport means and film-advancing means to sense relative movement of the film portions passing the sound-reproducing means and viewing aperture, the sensing means including a movable loop-setting probe biased against the film to establish an optimum film loop size;
   h. mechanical servo means coupled to the film movement sensing means for correcting mismatched movements of the film and achieving synchronous movement between said film portions, the mechanical servo means including a variable pulley having;
      h 1. a pair of sections defining a pulley groove whose diameter becomes increased and decreased when the sections are moved toward and away from one another respectively, the pulley being coupled to the shutter by a drive belt encircling them both, and,
      h 2. link means responsive to probe movements for varying the pulley groove diameter;
   wherein variations of the pulley groove diameter automatically vary the intermittent rate of movement of the film-advancing means to automatically restore synchronous movement between said film portions
   i. a motor connected to the support frame;
   j. a motor shaft connected to the variable pulley;
   k. a first gear fixed to the motor shaft;
   l. a sound shaft attached to the film transport means;
   m. a second gear connected to the sound shaft, the first and second gears being interengaged so that the variable pulley and sound shaft rotate simultaneously;
   n. a flywheel fixed to the sound shaft; and,
   o. a torsion spring interconnecting the flywheel and second gear so that jerky and irregular movements transmitted to the second gear are dampened to allow the sound shaft and sound-reproducing means to rotate smoothly.

* * * * *